(12) United States Patent
Hu et al.

(10) Patent No.: US 10,824,066 B2
(45) Date of Patent: Nov. 3, 2020

(54) LIGHT SOURCE AND PROJECTION SYSTEM

(71) Applicant: APPOTRONICS CORPORATION LIMITED, Shenzhen (CN)

(72) Inventors: Fei Hu, Shenzhen (CN); Haixiong Hou, Shenzhen (CN); Yi Li, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 65 days.

(21) Appl. No.: 16/314,338

(22) PCT Filed: Apr. 21, 2017

(86) PCT No.: PCT/CN2017/081419
§ 371 (c)(1),
(2) Date: Dec. 28, 2018

(87) PCT Pub. No.: WO2018/000920
PCT Pub. Date: Jan. 4, 2018

(65) Prior Publication Data
US 2020/0201152 A1    Jun. 25, 2020

(30) Foreign Application Priority Data

Jul. 1, 2016   (CN) .......................... 2016 1 0518166

(51) Int. Cl.
*G03B 21/20*        (2006.01)
(52) U.S. Cl.
CPC ......... *G03B 21/204* (2013.01); *G03B 21/208* (2013.01); *G03B 21/2066* (2013.01)
(58) Field of Classification Search
CPC . G03B 21/204; G03B 21/2066; G03B 21/208
See application file for complete search history.

(56) References Cited

U.S. PATENT DOCUMENTS

| | | |
|---|---|---|
| 2012/0242912 A1 | 9/2012 | Kitano |
| 2016/0026076 A1 | 1/2016 | Hu |
| | (Continued) | |

FOREIGN PATENT DOCUMENTS

| | | |
|---|---|---|
| CN | 2826474 Y | 10/2006 |
| CN | 103913936 A | 7/2014 |
| | (Continued) | |

OTHER PUBLICATIONS

International Search Report for PCT/CN2017/081419, dated Jul. 12, 2017.

(Continued)

*Primary Examiner* — Anne M Hines
(74) *Attorney, Agent, or Firm* — Marshall, Gerstein & Borun LLP (57) ABSTRACT

A light source, including an excitation light source, an excited light supplying device, a partially coating film and a light supplementing device. The partially coating film is arranged on light path of the excitation light and the excited light, which includes a first area for transmitting/reflecting the excitation light to form main path light or side path light respectively, and a second region area for reflecting/transmitting all incident light; the excited light supplying device is provided on light path of the main path light to generate excited light transmitted to the partially coating film after irradiated by main path light; the light supplement device is provided on light path of the side path light for performing light homogenization on the side path light and generating supplemental light transmitted to the partially coating film; and the supplemental light combines with the excited light after passing through the partially coating film.

19 Claims, 4 Drawing Sheets

(56) References Cited

U.S. PATENT DOCUMENTS

| | | | |
|---|---|---|---|
| 2017/0205695 A1 | 7/2017 | Hu et al. | |
| 2018/0024426 A1* | 1/2018 | Chen | H04N 9/3158 362/84 |
| 2019/0331990 A1* | 10/2019 | Zhang | G02B 27/141 |
| 2019/0353995 A1* | 11/2019 | Pan | H04N 9/3155 |
| 2019/0391470 A1* | 12/2019 | Pan | G02B 27/1026 |

FOREIGN PATENT DOCUMENTS

| | | |
|---|---|---|
| CN | 104020633 A | 9/2014 |
| CN | 204028554 U | 12/2014 |
| CN | 204028554 U | 12/2014 |
| CN | 204593250 U | 8/2015 |
| CN | 204986566 U | 1/2016 |
| CN | 105319819 A | 2/2016 |
| CN | 205353549 U | 6/2016 |
| EP | 2966502 A1 | 1/2016 |
| JP | 2012212129 A | 11/2012 |
| JP | 2016510160 A | 4/2016 |

OTHER PUBLICATIONS

Notice of Reasons for Refusal for Japanese Patent Application No. 2018-568700, dated Dec. 26, 2019.
The Second Office Action for Application No. CN 201610518166.1, dated Oct. 15, 2018.
Extended European Search Report for European Application No. 17818917.1, dated Dec. 3, 2019.

\* cited by examiner

LIGHT SOURCE AND PROJECTION SYSTEM

CROSS-REFERENCE TO RELATED APPLICATIONS

The present application is a National Stage of International Application No. PCT/CN2017/081419, filed Apr. 21, 2017, which claims priority to Chinese Patent Application No. 201610518166.1, filed Jul. 1, 2016, both of which are hereby incorporated by reference in their entireties.

TECHNICAL FIELD

The present disclosure relates to the field of projection display, and in particular, to a light source and a projection system.

BACKGROUND

Figure 1:
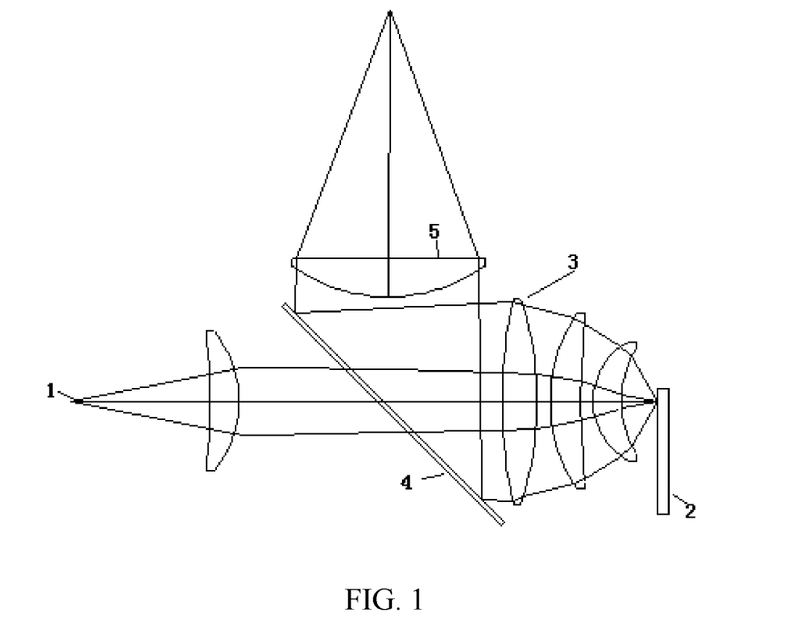
FIG. 1 is a schematic diagram of a light reflection structure in the prior art.

FIG. 1 shows a structure of a light source for projection or illumination in the prior art. As shown in FIG. 1, a partially coating film 4 is arranged between a laser generator 1 and a fluorescent wheel 2. The partially coating film 4 includes two regions, i.e., a transmissive region and a reflective region. The laser light is incident to the fluorescent wheel 2 after passing through the partially coating film 4 from left to right. The generated fluorescence is collected by a lens group 3, reflected by the partially coating film 4, concentrated by a condenser 5, and then supplied to a light modulator (not shown), so that the light signal can be modulated according to display data. In order to maximize efficiency, the region of the partially coating film 4 where laser light can pass through has substantially the same size as a size of the incident light spot.

Figure 2:
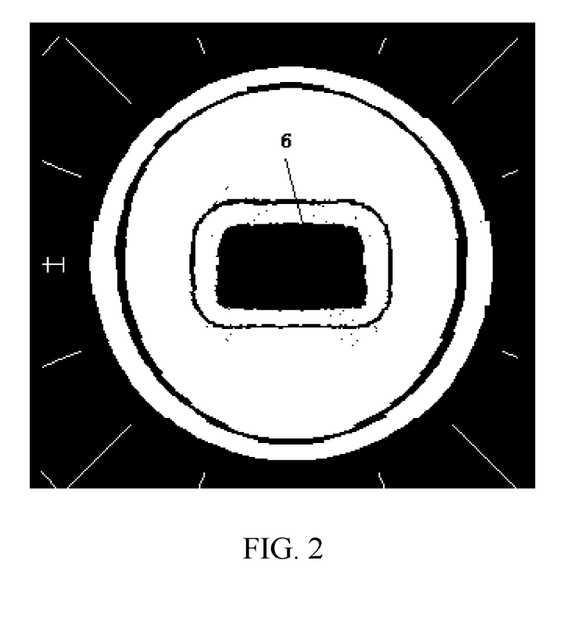
FIG. 2 is a light distribution diagram in the prior art.

However, when the fluorescent wheel 2 generates excited fluorescence, the light in the fluorescence having the same spectrum as the incident light will pass through the region and return along the original light path of the incident light. Therefore, after the fluorescence is focused by the condenser 5, the center of the light distribution will miss this fluorescence part. As shown in FIG. 2, a light-missing region 6 appears in the center, thereby reducing the uniformity of the light output by the light source.

SUMMARY

Technical Problem to be Solved

The present disclosure provides a light source that optically supplements a light-missing region, so as to improve the uniformity of light output by a light source.

Solution to the Problem

According to a first aspect, an embodiment of the present disclosure provides a light source, including an excitation light source; an excited light supplying device; a partially coating film; and a light supplementing device;

the excitation light source is configured to emit excitation light, the excited light supplying device is configured to generate excited light under irradiation of the excitation light, the partially coating film is located on a light path of the excitation light and a light path of the excited light, the partially coating film includes a first area and a second area, the first area is configured to transmit/reflect an amount of the excitation light to form a main path light and reflect/transmit another amount of the excitation light to form a side path light, the second area is configured to reflect/transmit all incident light, the excited light supplying device is located on a light path of the main path light and deviates from a light path of the side path light, and the excited light supplying device is configured to generate the excited light propagating toward the partially coating film after being excited by the main path light, the light supplementing device is located on the light path of the side path light and configured to perform light homogenization to the side path light and generate supplemental light propagated to the partially coating film and the supplemental light is combined with the excited light after passing through the first area of the partially coating film.

According to a second aspect, an embodiment of the present disclosure provides a projection system including the abovementioned light source.

Advantageous Effect

The technical solution of the present disclosure uses the side path light to form a uniform light and returns this uniform light to the partially coating film. After passing through the first area of the partially coating film, this uniform light is combined with the excited light, and the missing light part in the excited light having the same spectrum as the excitation light is supplemented, thereby improving the uniformity of the light output by the light source.

DESCRIPTION OF EMBODIMENTS

In an embodiment of the present disclosure, an excitation light is transmitted to an excited light supplying device through a partially coating film. The partially coating film generally includes two areas, i.e., a first area and a second area. In some embodiments, the excitation light is transmitted through the first area of the partially coating film and then reaches the excited light supplying device, and in other embodiments, the excitation light is reflected by the first area of the partially coating film and then reaches the excited light supplying device. In practice, regardless of whether the excitation light is transmitted or reflected to the excited light supplying device, the transmission/reflection of the partially coating film to the excitation light is difficult to achieve 100%. Most of the excitation light is transmitted or reflected to the excited light supplying device after the transmission/reflection of the partially coating film, while a small amount of the excitation light is missing after the transmission/reflection of the partially coating film. The inventor of the present disclosure noticed this, and realizes that the excitation light is split into two paths of light after the partially coating film, which are defined as a main path light and a side path light, respectively. The main path light is the most of the excitation light transmitted or reflected to the excited light supplying device after passing through the partially coating film. The side path light is the small amount of the excitation light that is missing and does not reach the excited light supplying device after passing through the partially coating film, and this small amount of light is often reflected/transmitted by the partially coating film toward a direction different from a direction of the main path light. The inventor of the present disclosure skillfully use the side path light to form a uniform light beam and return this light beam to the partially coating film. After transmission/reflection of the partially coating film, this light beam is combined with the excited light. In this way, the missing light part in the excited light having the same spectrum as the excitation light is supplemented, thereby improving the uniformity of the light output by the light source.

The present disclosure will be further described in the following with reference to the accompanying drawings and embodiments.

First Embodiment

Figure 3:
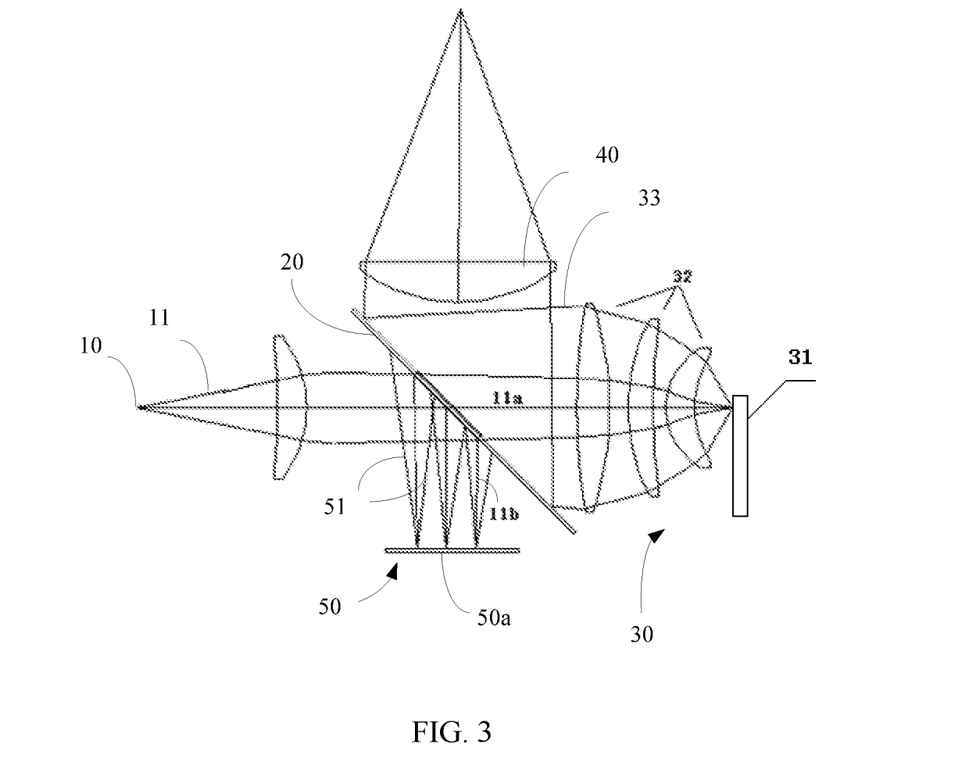
FIG. 3 is a schematic diagram of a light reflection structure using a reflective scattering light sheet.

With reference to FIG. 3, a light source includes an excitation light source 10, a partially coating film 20, an excited light supplying device 30, a light concentrating component 40, and a light supplementing device 50.

The excitation light source 10 is used to emit an excitation light 11. In this embodiment, the excitation light source 10 is a laser light source or a laser diode light source that emits a laser light having a specific wavelength, such as blue light, or blue light plus red light. This laser light is used as the excitation light. In other embodiments, the excitation light source may also use other types of light-emitting devices, such as an LED device, which will not be limited herein.

The excited light supplying device 30 is used to supply an excited light. In this embodiment, the excited light supplying device 30 includes a wavelength conversion device (such as the fluorescent wheel 31 in FIG. 3) and a light collecting system 32. The fluorescent wheel 31 is used to generate an excited light 33 under the irradiation of the excitation light. When the materials applied on the fluorescent wheel 31 are different, the fluorescent wave bands produced after excitation are also different, usually producing white light, or one or more primary colors. In this embodiment, the excitation light 11 is blue light, and the fluorescent wheel 31 is coated with a yellow fluorescent powder. It should be understood that in other embodiments, the excitation light having other wavelength ranges can be adopted, and the fluorescent wheel coated with the fluorescent material having other luminescent characteristics can be used, which will not be limited to the technical solutions of the above embodiments.

The excited light may propagate along a direction consistent with the incident direction of the excitation light, or may propagate along a direction opposite to the incident direction of the excitation light. The excited light generated by the reflective fluorescent wheel 31 provided in this embodiment propagates along a direction opposite to the incident direction of the excitation light, that is, the excited light propagates along a direction opposite to the incident path of the excitation light. The light collecting system 32 may be a lens group that is located on a light path where the excited light propagates, and the light collecting system 32 is used to collect and collimate the divergent fluorescence. The excited light is collimated by the light collecting system 32 and then reaches a side of the partially coating film 20. In other embodiments, the wavelength conversion device may also be implemented in other manners, such as a non-fluorescent mode or non-wheel mode. The light collecting system may also be omitted in the excited light supplying device 30, that is, the excitation light generated by the wavelength conversion device is not processed by a light collecting system. Such a solution is not within the scope of the present disclosure, but is included in the concept of the present disclosure.

Figure 4:
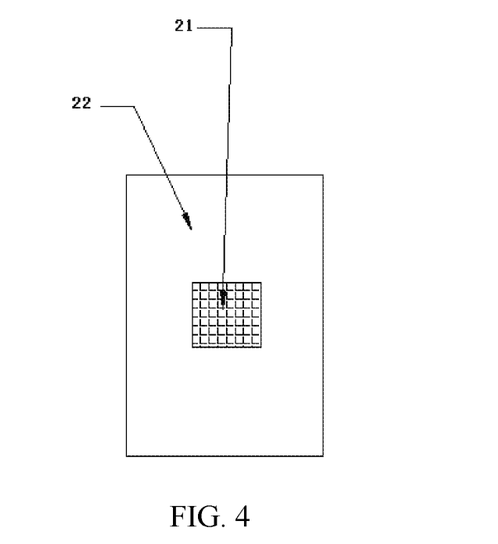
FIG. 4 is a schematic diagram of a partially coating film.

The partially coating film 20 is located in the light path of the excitation light, and is also located in the light path of the excited light. In this embodiment, the partially coating film 20 is obliquely disposed between the excitation light source 10 and the excited light supplying device 30. The partially coating film 20 includes a first area 21 and a second area 22, as shown in FIG. 4. Generally, the first area 21 is located at a center of the partially coating film 20, and the second area 22 is located at a periphery of the first area 21 and surrounds the first area 21. In other embodiments, the first area 21 and the second area 22 may also have other positional relation depending on the specific design. The first area 21 is located in the light path of the excitation light 11 output by the excitation light source 10. For maximum efficiency, the size and shape of the first area 21 is substantially the same as the size and shape of the light spot of the excitation light 11 reaching the partially coating film. Both the first area 21 and the second area 22 are located in the light path of the excited light 33. In this embodiment, the first area 21 is for transmitting the excitation light to form a main path light and reflecting the excitation light to form a side path light. In practice, the first area 21 is equivalent to a filter having a predetermined wavelength, but the filter is not 100% transmissive. That is, when the light reaches the first area 21, most of the light having a wavelength matched up with the first area 21 is transmitted, and a small amount of the light is reflected. In this embodiment, a main function of the first area 21 is to transmit the excitation light. Therefore, when the excitation light is blue light, the first area 21 is transmissive for blue light and reflective for yellow light, and when the excitation light is blue and red light, the first area 21 is transmissive for blue and red light and reflective for green light. When the main function of the first area 21 is to transmit the excitation light, the second area 22 is an area that reflects all the incident light. The total reflection means that the second area 22 is reflective for all incident light having any wavelength. In this embodiment, the second area 22 is reflective for all of the excitation light, the excited light, and the supplemental light generated by the light supplementing device 50.

In this embodiment, the first area 21 is located in the light path of the excitation light 11, and the size of the first area 21 is substantially the same as the size of the light spot of the incident excitation light 11, so theoretically, the excitation light 11 will totally pass through the first area 21 and then reach the fluorescent wheel 31. However, in practice, due to manufacturing process limitations, the transmittance of the first area 21 cannot reach 100%, so there is always some excitation light 11 failing to reach the fluorescent wheel 31 after passing through the first area 21, but being reflected and/or absorbed by the first area 21. In this case, the excitation light 11 is split into two paths of light after passing through the first area 21, such as a main path light 11a and a side path light 11b shown in FIG. 3. Herein, the main path light 11a is most of the excitation light 11 passing through the first area 21, which propagates along a first direction (in this embodiment, a direction along which the excitation light 11 originally propagates) and reaches the fluorescent wheel 31. The side path light 11b is a small amount of the excitation light 11 reflected by the first area 21 and propagates in a second direction. Herein, the second direction is different from the first direction. In this embodiment, the second direction is perpendicular to the first direction, so the side path light 11b cannot reach the fluorescent wheel 31. For the fluorescent wheel 31, the side path light 11b is the missing light.

Since both the first area 21 and the second area 22 are located in the light path of the excited light 33, when the excited light 33 reaches the first area 21 and the second area 22, the first area 21 is transmissive for the light of the excited light 33 having the same spectrum as the excitation light, and reflective for the other light of the excited light 33 having other spectrums. The second area 22 is reflective for light having any spectrum (including the excited light 33). The excited light 33 propagates along a third direction after being reflected. Herein, the third direction is different from the first direction. In this embodiment, the third direction is perpendicular to the first direction and opposite to the second direction. After being reflected, the excited light 33 forms the output light of the light source after being concentrated by the light concentrating component 40 located in its propagation path. However, since the light of the excited light having the same spectrum as the excitation light passes through the first area 21, the output light composed only by the excited light misses part light having the same spectrum as the excitation light. As a result, the uniformity of the output light output is reduced.

The light supplementing device 50 is located in the light path of the side path light 11b, and is used to generate supplemental light 51 (shown by an oblique line in the figure) after a uniform process to the side path light 11b (shown by a vertical line in the figure). The supplemental light 51 propagates along a direction opposite to the incident direction of the side path light 11b, and propagates along the third direction after passing through the first area 21 of the partially coating film and is combined with the reflected excited light 33, and this combined light serves as the light output by the light source. In this way, the missing light part in the excited light having the same spectrum as the excitation light is supplemented, thereby improving the uniformity of the light output by the light source. In this embodiment, the light supplementing device 50 is a reflective scattering plate 50a, and the reflective scattering plate 50a is located in the light path of the side path light, and generates scattered light after being irradiated by the side path light, thereby converting the side path light into a uniform light plate or light group and thus achieving the purpose of light homogenization. Since the reflective scattering plate 50a also has a reflective function, the scattered light can be reflected back to the first area of the partially coating film, thereby forming decoherent supplemental light. By adjusting a scattering angle of the reflective scattering plate and adjusting a spacing between the reflective scattering plate and the partially coating film, the divergence angle of the supplemental light after passing through the partially coating film is consistent with the divergence angle of the excited light after passing through the partially coating film, so that the overall efficiency can be maximized.

When the excitation light is blue light, the coating of the first area 21 is transmissive for blue light and reflective for yellow light, and the supplemental light is blue light. When the excitation light is blue light plus red light, the coating of the first area 21 is transmissive for red light and blue light and reflective for green light, so as to transmit the excitation light and filter out light having other bands, and the supplemental light is blue light plus red light. The red light has two parts, one part is the red light generated by the fluorescence being excited by blue light, and the other part is the red light directly collected from the scattering red light. By selecting the transmittance or size of the first area of the partially coating film, it is possible to control the amount of light reflected onto the light supplementing device, thereby controlling the amount of supplemental light.

The light path processing process of this embodiment will be described in the following with reference to FIG. 3.

Figure 5:
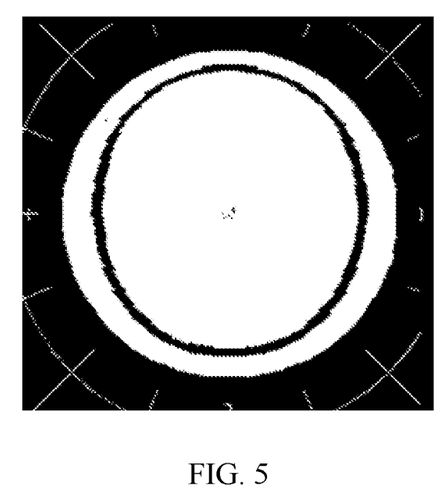
FIG. 5 is a light distribution diagram according to the present disclosure.

The excitation light output by the excitation light source 10 is divided into two paths of light by the partially coating film, the main path light 11a reaches the fluorescent wheel 31, and the side path light 11b reaches the reflective scattering plate 50a. The fluorescent wheel 31 generates an excited light under the irradiation of the main path light 11a, and the excited light is collected and collimated by the light collecting system 32 and then reaches a side of the partially coating film 20 facing the excited light supplying device 30. For the excited light that reaches the first area 21, the light having the same wavelength as the excitation light passes through the diaphragm of the first area 21 and propagates along the original propagation path of the excitation light, and the light having a different wavelength from the excitation light is reflected by the diaphragm of the first area 21 and propagates along the third direction. The excited light that reaches the second area 22 is reflected by the diaphragm of the second area 22 and propagates along the third direction, but the center of the light output at this time misses the light having the same wavelength as the excitation light, as a result, the uniformity of the center of the light is reduced. At the same time, the side path light 11b reaches the reflective scattering plate 50a, and is scattered and reflected by the reflective scattering plate 50a to form a path of light returning to the partially coating film 20. Herein, this path of light is referred to as supplemental light. For the supplemental light that reaches the first area 21, the light having the same wavelength as the excitation light passes through the diaphragm of the first area 21 and propagates along the third direction, and is added to the center of the excited light reflected by the partially coating film 20, so as to supplement the light having the same wavelength as the excitation light at the center of the excited light, thereby increasing the uniformity of the light at the center of the excited light, as shown in FIG. 5. It can be seen by comparing FIG. 2 with FIG. 5 that, the uniformity of the center of the output light is improved. The supplemental light that reaches the second area 22 is lost by reflection of the second area 22.

Second Embodiment

Figure 6:
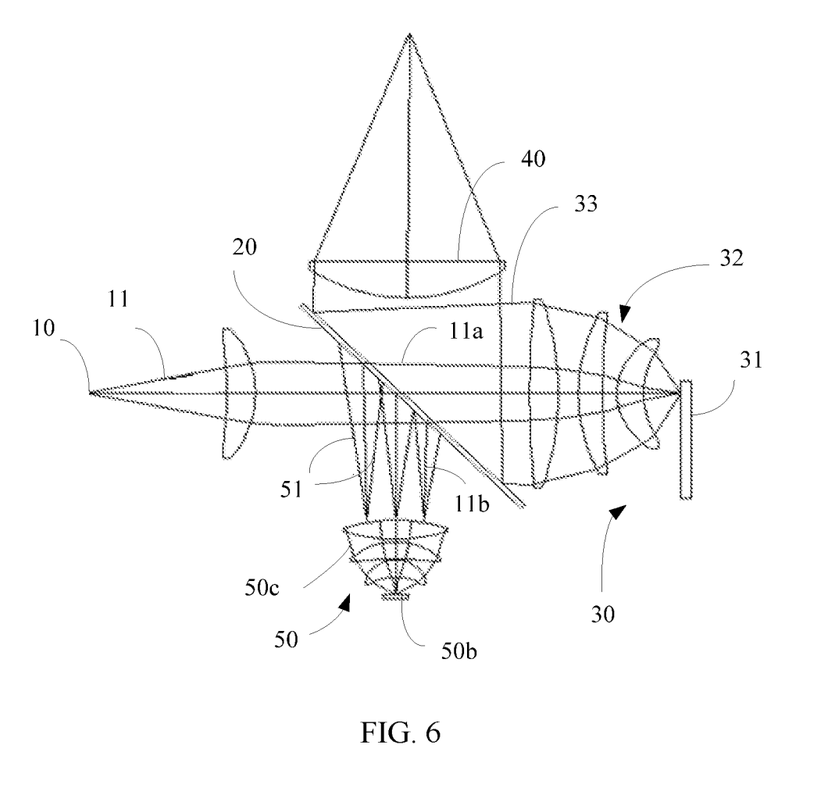
FIG. 6 is a schematic diagram of a light reflection structure using a Lambert scattering plate.

This embodiment differs from the first embodiment in the light supplementing device. With reference to FIG. 6, the light supplementing device 50 includes a Lambert scattering plate 50b and a light collecting system 50c. The Lambert scattering plate 50b is located in the light path of the side path light, and generates scattered light after being irradiated by the side path light 11b. The scattered light is concentrated by the light collecting system 50c and then reaches the first area 21 of the partially coating film 20 to form the supplemental light 51.

In this embodiment, the Lambert scattering plate can also be replaced with a white fluorescent plate. Herein, the white fluorescent plate is a fluorescent plate capable of absorbing the excitation light and generating white light. The white fluorescent plate generates white light after being irradiated by the side path light, and the white light is concentrated by the light collecting system and then reaches the first area of the partially coating film to form the supplemental light.

In this embodiment, by controlling the diameter of the light collecting system to be consistent with the size of the first area, the overall efficiency of the light source can be maximized.

Third Embodiment

Figure 7:
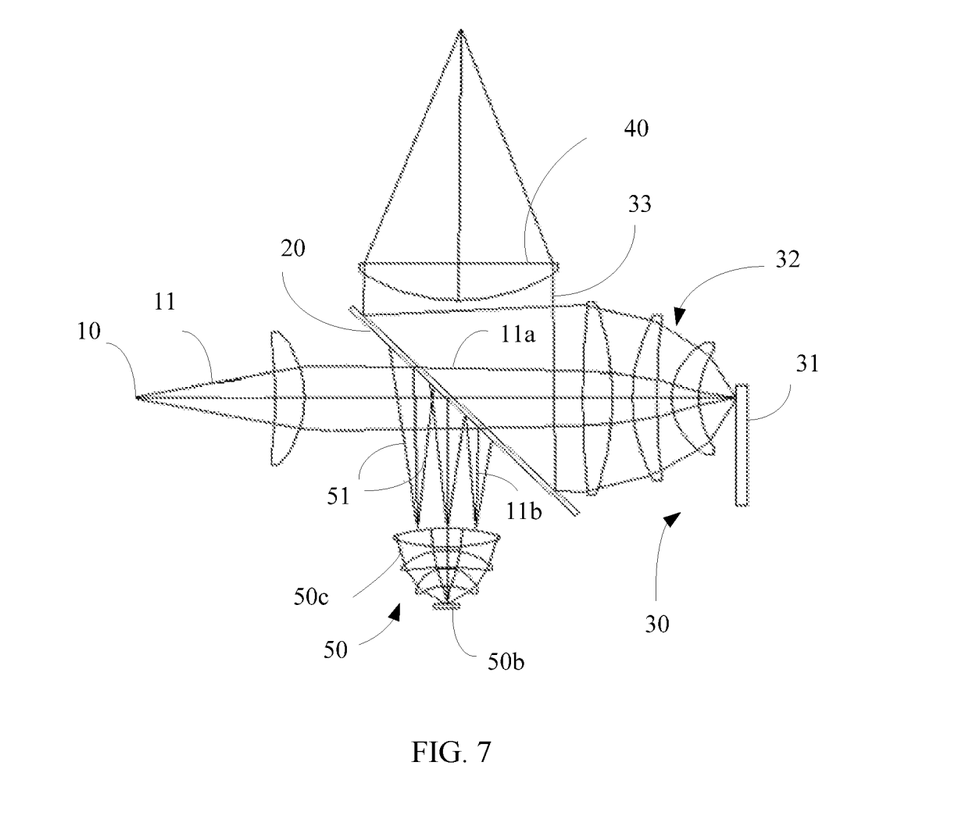
FIG. 7 is a schematic diagram of a light reflection structure using a different partially coating film.

This embodiment differs from the first embodiment and the second embodiment in the partially coating film. The first area 21 shown in FIG. 4 may also has the main function of reflecting the excitation light, and the reflectivity is not 100%. That is, the excitation light reflected by the first area 21 is formed as the main path light, and the excitation light passing through the first area 21 is formed as a side path light. The second area 22 is used to transmit all the incident light. Herein, the total transmission means that light having any wavelength can pass through the second area 22. With such a partially coating film, the reflectivity of the first area 21 is less than 100%, so that most of the excitation light 11a is reflected, and a small amount of the excitation light 11a passes through the first area 21. With reference to FIG. 7, the excitation light 11 is reflected by the first area 21 to form the main path light 11a, and passes through the first area 21 to form the side path light 11b. A propagation direction of the side path light 11b is perpendicular to a propagation direction of the main path light 11a. The fluorescent wheel 31 is excited by the main path light 11a to generate excited light 33. When the excited light 33 reaches the partially coating film 20, the excited light 33 passes through the partially coating film 20 and propagates along a third direction. Herein, the third direction is opposite to the first direction and perpendicular to the second direction.

In the above embodiments, the excited light is white light or monochromatic light or composite light having the same wavelength as the excitation light, and the excited light after being supplemented and concentrated reaches the spatial light modulator. Herein, the spatial light modulator may be a mono-piece light modulator or a multi-piece light modulator. In other embodiments, the light output by the light source may also be a multi-primary sequence light, and the spatial light modulator is also a multi-piece (e.g., three-piece) light modulator. When the output light is a multi-primary sequence light, the fluorescent wheel can be changed to a multi-segment structure, for example, the fluorescent wheel is a three-stage structure, which is respectively excited to generate red light, green light, and blue light. If the incident excitation light is blue light, the supplement blue light is always generated but only works in the blue segment. For example, a light valve synchronized with the fluorescent wheel may be provided between the partially coating film and the light supplementing device, when the fluorescent wheel outputs blue light, the light valve is opened to supplement the blue light; when the fluorescent wheel outputs red light and green light, the light valve is closed to prevent the supplement blue light from interfering the excited light through the partially coating film. If the incident excitation light is blue light plus red light, the supplement blue light is always generated and only works in the blue segment, and the supplement red light can be always generated or can be generated only in the red segment, if the red light is generated only in the red segment, the service life of the red light can be improved.

The present disclosure has been described above with reference to specific examples, which are merely used to illustrate the present disclosure and are not intended to limit the present disclosure. Those skilled in the art can make simple derivations, variations or substitutions based on the concept of the present disclosure.

The invention claimed is:

1. A light source, comprising:
an excitation light source;
an excited light supplying device;
a partially coating film; and
a light supplementing device;
wherein the excitation light source is configured to emit excitation light,
the excited light supplying device is configured to generate excited light under irradiation of the excitation light,
the partially coating film is located in a light path of the excitation light and a light path of the excited light, the partially coating film comprises a first area and a second area, the first area is configured to transmit an amount of the excitation light to form a main path light and reflect another amount of the excitation light to form a side path light, the second area is configured to reflect all incident light, the excited light supplying device is located in a light path of the main path light and deviates from a light path of the side path light, and the excited light supplying device is configured to generate the excited light propagating toward the partially coating film after being excited by the main path light,
the light supplementing device is located in the light path of the side path light and configured to perform light homogenization to the side path light and generate supplemental light propagated to the partially coating film, and the supplemental light is combined with the excited light after passing through the first area of the partially coating film.

2. A projection system, comprising the light source according to claim 1.

3. The light source according to claim 1, wherein the light supplementing device is a reflective scattering plate, and the reflective scattering plate is located in the light path of the side path light, and is configured to generate scattered light after being irradiated by the side path light, and reflects the scattered light back to the first area of the partially coating film to form the supplemental light.

4. The light source according to claim 3, wherein a scattering angle of the reflective scattering plate and a spacing between the reflective scattering plate and the partially coating film are adjusted to enable a divergence angle of the supplemental light after passing through the partially coating film to be consistent with a divergence angle of the excited light after passing through the partially coating film.

5. The light source according to claim 1, wherein the light supplementing device comprises a Lambert scattering plate and a light collecting system, the Lambert scattering plate is located in the light path of the side path light, and is configured to generate scattered light after being irradiated by the side path light, and the scattered light is concentrated by the light collecting system and then incident to the first area of the partially coating film to form the supplemental light.

6. The light source according to claim 5, wherein the light collecting system has an aperture in consistent with a size of the first area.

7. The light source according to claim 1, wherein the light supplementing device comprises a white fluorescent plate and a light collecting system, and the white fluorescent plate is located in the light path of the side path light, and is configured to generate white light after being irradiated by the side path light, and the white light is concentrated by the light collecting system and then incident to the first area of the partially coating film to form the supplemental light.

8. The light source according to claim 7, wherein the light collecting system has an aperture in consistent with a size of the first area.

9. The light source according to claim 1, wherein a shape and a size of the first area are consistent with a shape and a size of a light spot of the excitation light incident to the partially coating film.

10. The light source according to claim 1, wherein the second area is located at a periphery of the first area and surrounds the first area, the main path light propagates along a first direction, the side path light propagates along a second direction, and the excited light forms an excited light propagating along a third direction after passing through the first area and the second area, wherein the first direction, the second direction, and the third direction are different directions.

11. A light source, comprising:
an excitation light source;
an excited light supplying device;
a partially coating film; and
a light supplementing device;
wherein the excitation light source is configured to emit excitation light, the excited light supplying device is configured to generate excited light under irradiation of the excitation light, the partially coating film is located in a light path of the excitation light and a light path of the excited light, the partially coating film comprises a first area and a second area, the first area is configured to reflect an amount of the excitation light to form a main path light and transmit another amount of the excitation light to form a side path light, the second area is configured to transmit all incident light, the excited light supplying device is located on a light path of the main path light and deviates from a light path of the side path light, and the excited light supplying device is configured to generate the excited light propagating toward the partially coating film after being excited by the main path light, the light supplementing device is located in the light path of the side path light and configured to perform light homogenization to the side path light and generate supplemental light propagated to the partially coating film, and the supplemental light is combined with the excited light after passing through the first area of the partially coating film.

12. The light source according to claim 11, wherein the light supplementing device is a reflective scattering plate, and the reflective scattering plate is located in the light path of the side path light, and is configured to generate scattered light after being irradiated by the side path light, and reflects the scattered light back to the first area of the partially coating film to form the supplemental light.

13. The light source according to claim 12, wherein a scattering angle of the reflective scattering plate and a spacing between the reflective scattering plate and the partially coating film are adjusted to enable a divergence angle of the supplemental light after passing through the partially coating film to be consistent with a divergence angle of the excited light after passing through the partially coating film.

14. The light source according to claim 11, wherein the light supplementing device comprises a Lambert scattering plate and a light collecting system, the Lambert scattering plate is located in the light path of the side path light, and is configured to generate scattered light after being irradiated by the side path light, and the scattered light is concentrated by the light collecting system and then incident to the first area of the partially coating film to form the supplemental light.

15. The light source according to claim 14, wherein the light collecting system has an aperture in consistent with a size of the first area.

16. The light source according to claim 11, wherein the light supplementing device comprises a white fluorescent plate and a light collecting system, and the white fluorescent plate is located in the light path of the side path light, and is configured to generate white light after being irradiated by the side path light, and the white light is concentrated by the light collecting system and then incident to the first area of the partially coating film to form the supplemental light.

17. The light source according to claim 16, wherein the light collecting system has an aperture in consistent with a size of the first area.

18. The light source according to claim 11, wherein a shape and a size of the first area are consistent with a shape and a size of a light spot of the excitation light incident to the partially coating film.

19. The light source according to claim 11, wherein the second area is located at a periphery of the first area and surrounds the first area, the main path light propagates along a first direction, the side path light propagates along a second direction, and the excited light forms an excited light propagating along a third direction after passing through the first area and the second area, wherein the first direction, the second direction, and the third direction are different directions.

* * * * *